United States Patent [19]

Anderson

[11] 4,363,382

[45] Dec. 14, 1982

[54] DISC BRAKES FOR VEHICLES

[75] Inventor: Robert A. Anderson, West Midlands, England

[73] Assignee: Lucas Industries Limited, Birmingham, England

[21] Appl. No.: 221,262

[22] Filed: Dec. 30, 1980

[30] Foreign Application Priority Data

Jan. 4, 1980 [GB] United Kingdom ................ 8000258

[51] Int. Cl.$^3$ ............................................. F16D 55/18
[52] U.S. Cl. .................................. 188/71.4; 188/72.6; 188/106 F
[58] Field of Search ..................... 188/71.3, 71.4, 72.1, 188/72.2, 72.4, 72.6, 106 F

[56] References Cited

U.S. PATENT DOCUMENTS

| | | | |
|---|---|---|---|
| 4,004,657 | 1/1977 | Ostrowski | 188/71.3 |
| 4,089,392 | 5/1978 | Ostrowski | 188/71 X |

FOREIGN PATENT DOCUMENTS 1277345  6/1972  United Kingdom ............... 188/71.4

*Primary Examiner*—Duane A. Reger

*Attorney, Agent, or Firm*—Scrivener, Clarke, Scrivener and Johnson

[57] ABSTRACT

In a disc brake the application of the brake is initiated by angular movement of pressure plates in opposite directions, the pressure plates then moving apart into engagement with friction discs which are urged into engagement with opposed radial surfaces in a stationary housing. The angular movement is effected hydraulically by an actuator comprising a piston working in a bore of a cylinder, the axis of which is substantially at right angles to that of the brake. The piston acts through a part-spherical rocking thrust coupling associated with a pull-rod passing through the actuator with a substantial clearance, the inner end of the pull-rod being pivotally coupled to the junction of a pair of toggle links connected between lugs on the pressure plates. The outer end of the pull-rod is extended for connection through a transmission member to a hand lever for applying the brake mechanically. A thrust member is disposed between the piston and the spherical rocking coupling and is engageable with a thrust transmitting force on the piston for sliding movement in a transverse direction with respect to the axis of the cylinder to accommodate angular movement of the pull-rod when the brake is applied.

10 Claims, 5 Drawing Figures

DISC BRAKES FOR VEHICLES

SPECIFIC DESCRIPTION

This invention relates to improvements in disc brakes of the kind in which rotatable friction discs are adapted to be brought into engagement with opposed radial surfaces in a stationary housing by pressure plates located between the friction discs. Balls are located in co-operating oppositely inclined recesses in the adjacent faces of the pressure plates and the application of the brake is initiated by moving the pressure plates angularly in opposite directions, the pressure plates then moving apart into engagement with the friction discs which are urged into engagement with the radial surfaces in the housing. The pressure plates are carried round with the friction discs until one is arrested by the engagement of a lug on the plate with a stop abutment in the housing and the continued angular movement of the other pressure plate provides a servo action. The angular movement of the pressure plates to initiate the application of the brake is effected hydraulically by an actuator comprising a cylinder and piston assembly of which the axis is substantially at right angles to the axis of the brake and of which one component is fixed relative to the housing and the other is movable and acts through a part-spherical rocking thrust coupling associated with a pull-rod passing through the actuator with a substantial clearance, the inner end of the pull-rod being pivotally coupled to the junction of a pair of toggle links connected between lugs on the pressure plates.

A brake of that kind is hereinafter referred to as a brake of the kind set forth and is particularly suitable for use in tractors and like vehicles.

In a brake of the kind set forth the outer end of the pull-rod may be extended for connection through any convenient form of transmission line to a hand lever for applying the brake mechanically. When the connection with the transmission line is constrained against floating movement, both ends of the rod are defined at specific points. Difficulty may then be experienced in accommodating angular movement of the rod through the piston which may be substantial, particularly when the distance from the connection with the transmission to the spherical coupling is substantial.

According to our invention in a brake of the kind set forth the outer end of the pull-rod is extended for connection through a specifically defined point to a transmission line, and a thrust member is disposed between the movable component and the spherical rocking coupling, the thrust member being engagable with a thrust transmitting force on the movable component for sliding movement in a transverse direction with respect to the axis of the piston and cylinder assembly to accommodate angular movement of the pull-rod when the brake is applied.

Preferably the face of the thrust member which engages with the thrust transmitting force is of low friction to facilitate sliding. Conveniently the thrust member itself is constructed from a low-friction material.

The provision of the sliding thrust member ensures that there are no side loads on the movable component when the brake is operated. In a retracted position the movable component engages with a stop face in the fixed component so that lost-motion is taken up and there is no tendency for the components to move about and rattle.

In one construction the movement of the movable component is transmitted from the spherical rocking coupling onto a trunnion through a compression strut in the form of a tube, and the pull-rod projects through the tube being connected at its outer end to the trunnion, the trunnion being journalled in a crank fast with a shaft which is rotatable on each occasion that the brake is applied whereby the thrust from the movable component produces a pull in the rod with the direction of the force being reversed by the trunnion, and angular movement of the shaft to apply the brake mechanically causes the rod to slide through the tube so that the movable component is unaffected.

Preferably there is an adjustable connection between the pull-rod and the trunnion by means of which the effective length of the pull-rod can be adjusted to compensate for wear of the friction lining.

One embodiment of our invention is illustrated in the accompanying drawings in which.

Figure 1:
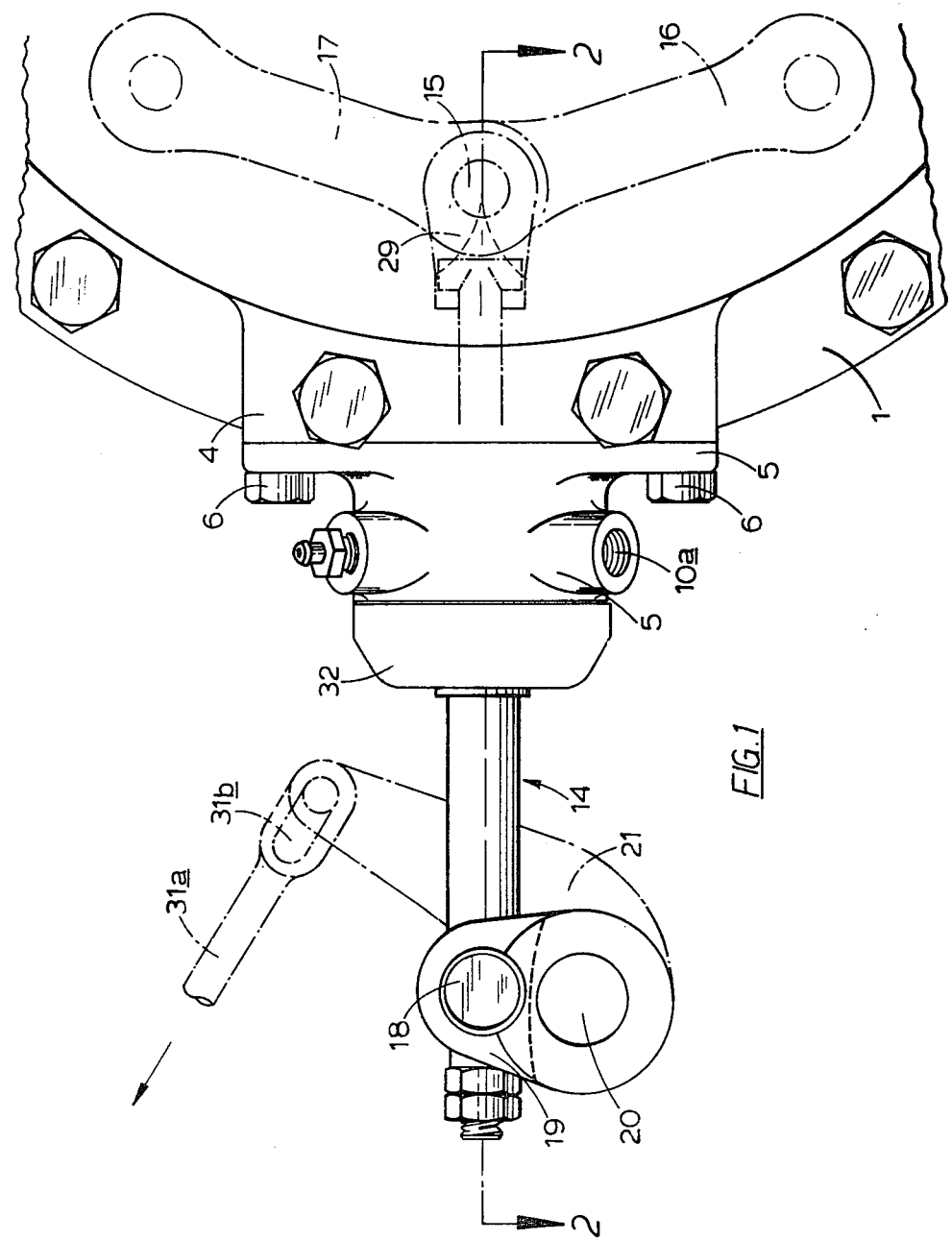
FIG. 1 is an elevation of a brake-applying mechanism for a brake of the kind set forth, also showing adjacent parts of the brake.
Figure 2:
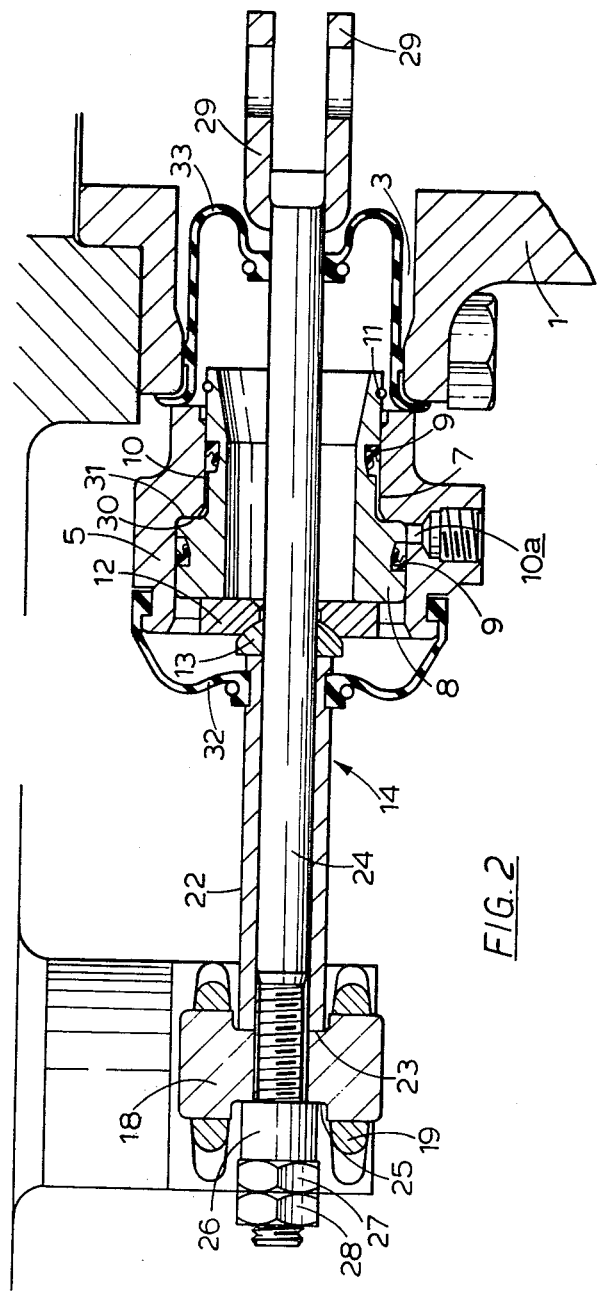
FIG. 2 is a section on the line 2—2 of FIG. 1.
Figure 3:
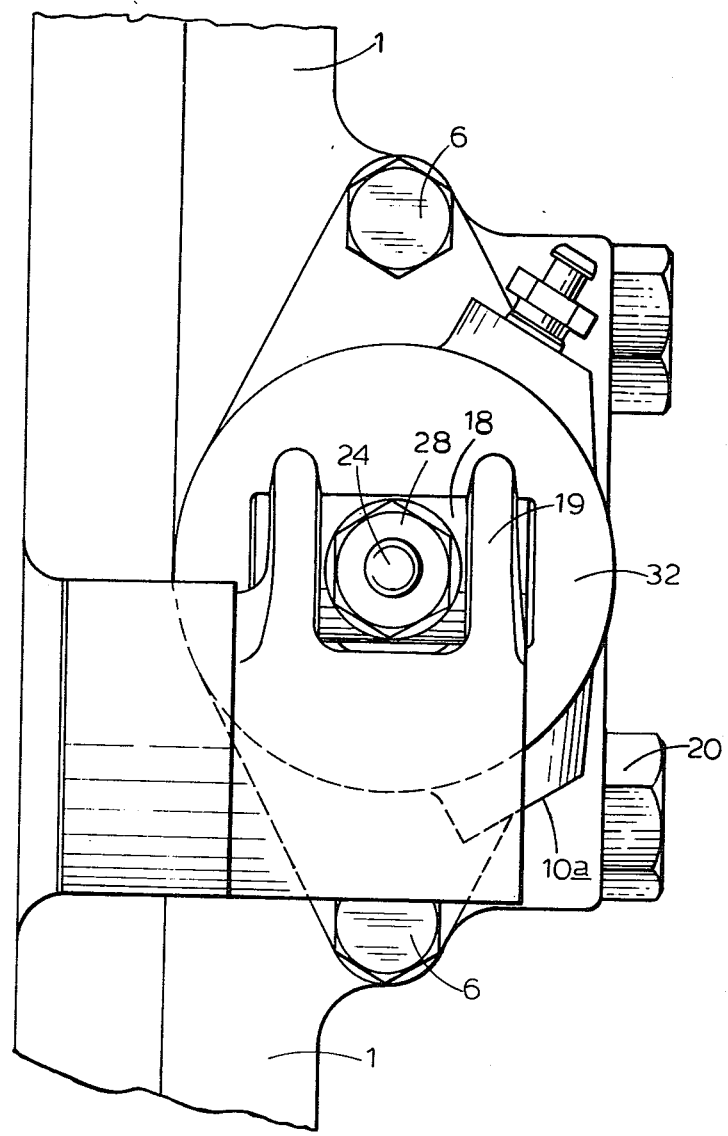
FIG. 3 is an end elevation of the applying mechanism shown in FIG. 1.

In the embodiment shown in the drawings the brake housing is indicated by the reference numeral 1. The housing 1 is formed with an opening 3 in its periphery around which there is an annular flange 4 providing a seating for an hydraulic cylinder component 5 which is secured to the housing by bolts 6 and is open at both ends.

The axis of the cylinder 5 is substantially at right angles to that of the brake.

The cylinder 5 has a stepped bore 7 in which works a hollow annular stepped piston component 8 sealed by seals 9. The working space of the cylinder is the annular space 10 around the piston at the step in diameter and a connection 10a is made to this space from a master cylinder or other source of fluid under pressure. Outward movement of the piston is limited by a circlip 11 located in an annular groove in the cylinder wall adjacent to its open inner end.

Seating on the outer end of the piston is an annular thrust member 12 having a part-spherical outer surface co-operating with a complementary surface on the inner end of a collar 3. The thrust member 12 is of a low-friction material and has a sliding engagement for radial movement with the outer end of the piston 8.

Figure 4:
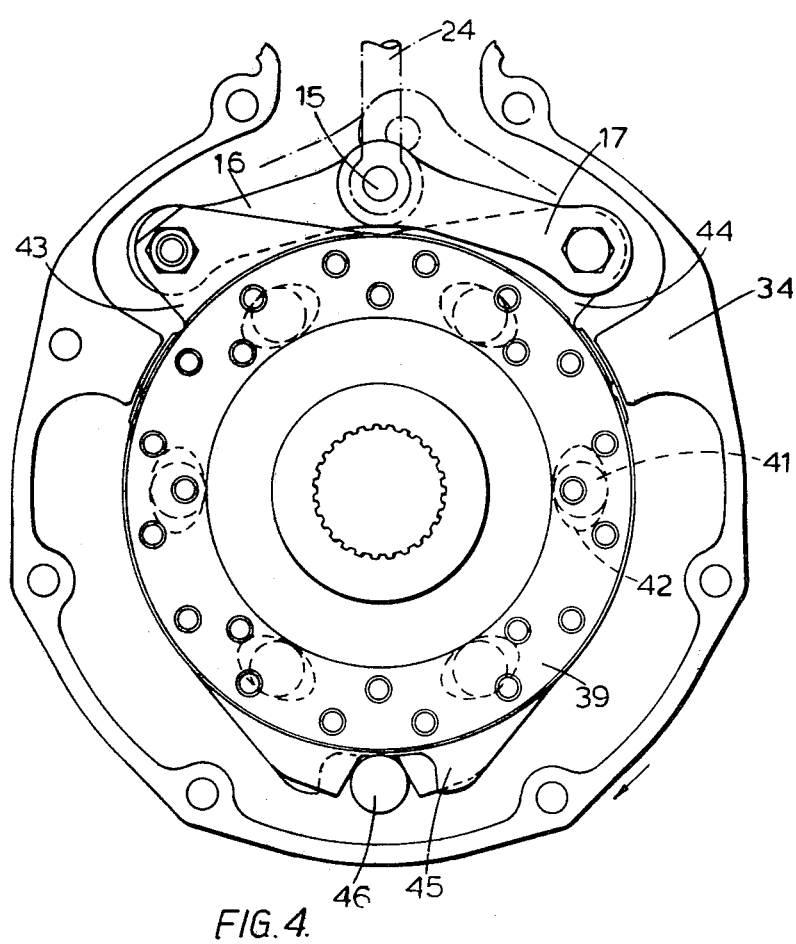
FIG. 4 is a transverse section through a brake of the self-energising spreading type.
Figure 5:
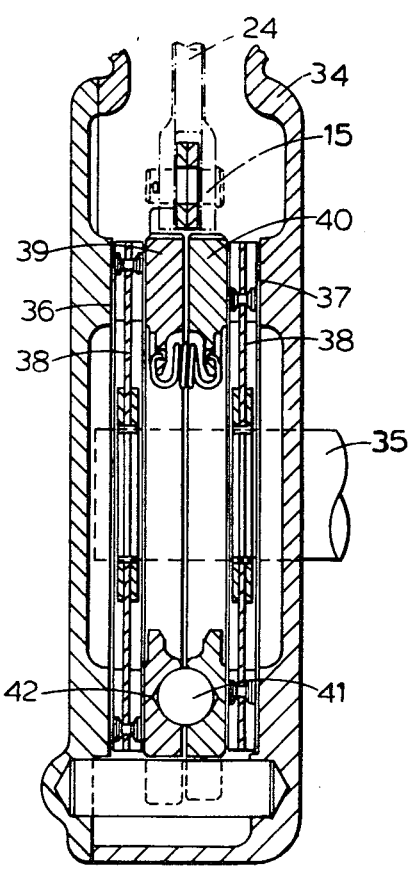
FIG. 5 is a longitudinal section through the brake shown in FIG. 4.

The collar 13 is associated with a force transmitting assembly 14 for transmitting a brake-applying force from the piston 8 to a pin 15 at the junction of opposed toggle levers 16, 17 of which the outer ends are connected to lugs on the pressure plates of a brake of the self-energising spreading type which is illustrated in FIGS. 4 and 5 of the accompanying drawings.

The force transmitting assembly 14 comprises a trunnion 18 which is journalled for rotation in a bifurcated crank 19 fast with a rotatable transverse shaft 20, and a radial brake-applying lever 21 is also fast with the shaft 20. A compression tube in the form of a distance piece 22 abuts at opposite ends between the collar 13 and a flat 23 on the trunnion 18. A pull-rod 24 extending through the tube 22 and the collar 13 also extends at its outer end through an opening in the trunnion 18 to act on a second flat 25 parallel with and diametrically opposed to the flat 23 through a thrust washer 26, a nut 27 and a lock nut 28. The inner end of the rod 14 is coupled to the pin 15 through a fitting 29 of U-shaped outline.

In the inoperative retracted position shown in the drawings a shoulder 30 at a step of the change in diameter engages with a complementary shoulder 31 in the cylinder 5.

When the brake is to be applied hydraulically for normal service braking hydraulic fluid under pressure is introduced into the annular space 10 to urge the piston 8 in an outwards direction with respect to the cylinder 5. This transmits a thrust to the trunnion 18 through the collar 13 and the tube 22 which causes the crank 19 and the shaft 20 to rotate, in turn, applying a tensile force to the rod 14 which moves in unison with the tube 22 to urge the toggle levers 16 and 17 outwardly to apply the brake.

Circumferential movement of the pin 15 with the toggle levers 16 and 17 when the brake is applied is accommodated by the thrust member 12 sliding with respect to the outer end of the piston 8, with angular movement of the assembly 14 being accommodated by the collar 13 rocking in the recess in the thrust member 12.

When the brake is to be applied mechanically or manually, for parking or in an emergency, the lever 21 is moved angularly by a force applied to its outer end by a transmission member 31a in the form of a rod or cable. The angular movement of the lever 21 imparts corresponding movement to the crank 19 which, in turn, withdraws the rod 24 relatively from the housing 3 to withdraw the toggle levers 16 and 17 as described above. When this occurs, the rod 24 slides through the tube 22 and the collar 13 so that the piston 8 is unaffected.

The transmission member 31a is coupled to the lever 21 through a lost-motion connection 31b so that the transmission member 31a is unaffected by angular movement of the lever 21 when the brake is applied hydraulically.

To compensate for wear of the friction linings the effective length of the rod 24 can be shortened by screwing the nut 27 further onto the rod 24.

Both ends of the cylinder 5 are sealed against the ingress of water or other foreign matter by flexible boots 32 and 33.

In a modification of the construction described above the collar 13 and the tube 22 may comprise a one-piece component.

A disc brake in which rotatable friction discs are adapted to be brought into engagement with opposed radial surfaces by pressure plates located between the friction discs will now be described with reference to FIGS. 4 and 5 of the accompanying drawings.

The self-energising spreading type of brake illustrated in FIGS. 4 and 5 is adapted for braking a shaft for transmitting drive to a wheel of a vehicle. The brake comprises a housing 34 into which the shaft 35 extends, the housing 34 having spaced radial braking surfaces 36, 37 between which are located rotatable friction discs 38. The discs 38 are slidably keyed to the shaft 35, and together with the braking surfaces 36, 37 constitute the co-operating friction members having relatively rotatable friction surfaces.

Brake applying means for actuation by the pull-rod 24 comprises an expander mechanism in the form of two angularly movable pressure plates 39 and 40 in the form of rings located between the pair of discs 38, balls 41 located in oppositely inclined co-operating recesses 42 in adjacent faces of the plates 39, 40, and the pair of toggle levers 16, 17 for moving the pressure plates 39, 40 angularly in relative opposite directions.

The toggle links 16, 17 are connected between radially projecting lugs 43, 44 on the plates 39, 40 and one end of the pull-rod 24 is connected by the pin 15 to the junction of the links 16, 17.

Movement of the pull-rod 24 in the brake applying direction is effected by the brake applying mechanism and initiates the angular movement of the pressure plates 39, 40 in relatively opposite directions. The balls 41 then tend to ride out of the recesses 42 and urge the plates 39, 40 apart into engagement with the friction discs 38 which are then urged into engagement with the radial surfaces 36, 37 in the housing 34.

One of the pressure plates 39 is provided with a lug 45 which engages with a stop abutment 46 in the housing 34 to arrest the plate 39, whereby continued angular movement of the other plate 40 provides a servo action.

I claim:

1. A disc brake comprising a housing incorporating rotatable friction discs, opposed radial surfaces, pressure plates located between said friction discs and balls located in co-operating oppositely inclined recesses in adjacent faces of said pressure plates, and an actuator assembly of which the axis is substantially at right angles to the axis of the brake, said actuator comprising a first component fixed relative to said housing, and a second movable component movable with respect to said component, said actuator assembly hydraulically initiating application of the brake by effecting angular movement of said pressure plates in opposite directions whereby said pressure plates move apart into engagement with said friction discs which are urged into engagement with said radial surfaces in said housing, one of said pressure plates being provided with a lug which engages with a stop abutment to arrest said one pressure plate, whereby continued angular movement of the other of said pressure plates provides a servo action, said actuator assembly incorporating a part-spherical rocking thrust coupling through which said movable component acts, and a pull-rod passing through said actuator assembly with a substantial clearance and with which said coupling co-operates, and a thrust member disposed between said movable component and said spherical rocking coupling, the inner end of said pull-rod being pivotally connected to the junction of a pair of toggle links connected between lugs on said pressure plates and the outer end of said pull-rod being extended for connection through a specifically defined point to a transmission member, and said thrust member being engageable with a thrust transmitting force on said movable component for sliding motion in a transverse direction with respect to the axis of said actuator assembly to accommodate angular movement of said pull-rod when the brake is applied.

2. A disc brake as claimed in claim 1, wherein the face of said thrust member which engages with said thrust transmitting force on said movable component is of low friction.

3. A disc brake as claimed in claim 2, wherein said thrust member is itself constructed from a low-friction material.

4. A disc brake as claimed in claim 1, wherein said transmission member is connected to means for applying the brake mechanically, and means are provided to allow said pull-rod to move through said actuator assembly whereby said movable component is unaffected when the brake is applied mechanically.

5. A disc brake as claimed in claim 4, wherein said movable component engages in a retracted position with a stop face in said fixed component to take up lost-motion of said movable component when the brake is applied mechanically.

6. A disc brake as claimed in claim 4, wherein a compression strut in the form of a tube transmits movement of the movable component from the spherical rocking coupling onto a trunnion, and said pull-rod projects through said tube and is connected at its outer end to said trunnion, said trunnion being journalled in a crank fast with a shaft which is rotatable on each occasion that the brake is applied, whereby the thrust from said movable component produces a pull in said rod with the direction being reversed by said trunnion, and angular movement of said shaft to apply the brake mechanically causes said rod to slide through said tube, whereby said movable component is unaffected.

7. A disc brake as claimed in claim 6, wherein said transmission member is coupled to a brake applying lever also fast with said shaft through a lost-motion connection whereby angular movement of said lever causes said rod to slide through said tube when said brake is applied mechanically, and said transmission member is unaffected by angular movement of said lever when the brake is applied hydraulically.

8. A disc brake as claimed in claim 6, wherein said spherical rocking coupling comprises a part-spherical outer surface on said thrust member co-operating with a complementary surface on the inner end of a collar, and the inner end of said compression tube abuts the outer end of said collar.

9. A disc brake as claimed in claim 6, wherein said spherical rocking coupling comprises a part spherical outer surface on said thrust member co-operating with a complementary surface on the inner end of a collar, the collar being integral with and located on the inner end of said compression tube.

10. A disc brake as claimed in claim 6, wherein an adjustable connection is provided between said pull-rod and said trunnion to permit adjustment of the effective length of said pull-rod.

* * * * *